Nov. 27, 1962  A. Y. WARNER ET AL  3,065,513
SEPARABLE LINK
Filed Dec. 4, 1959
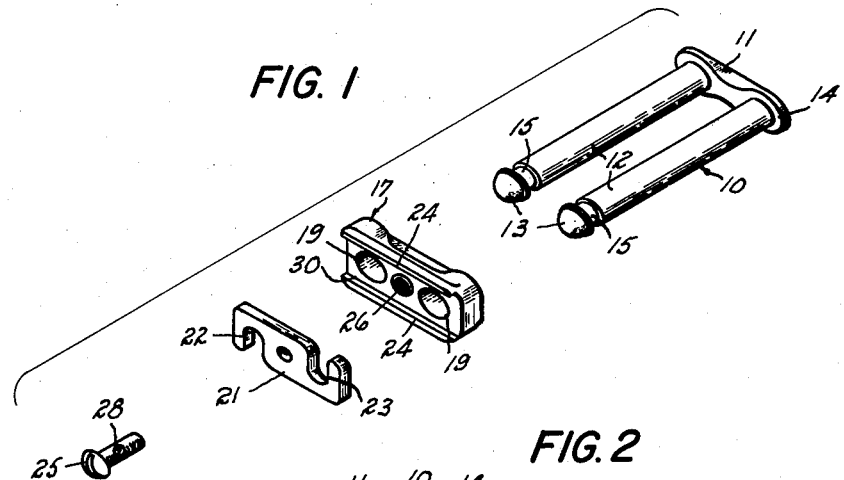
FIG. 1
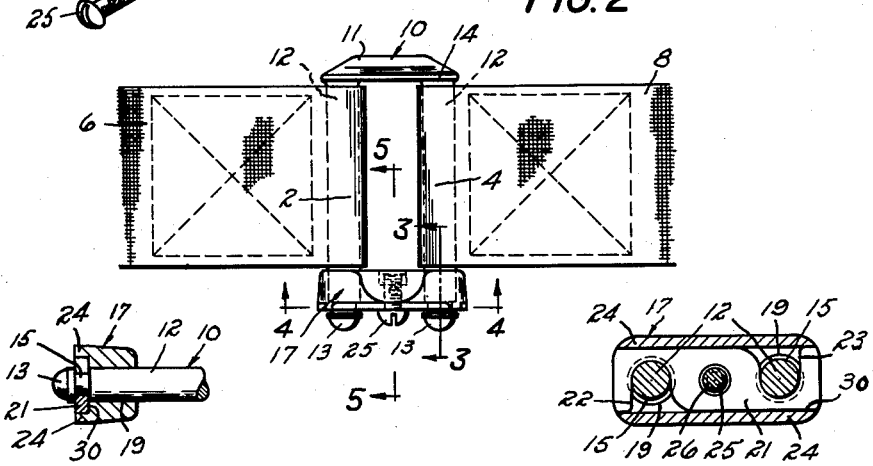
FIG. 2
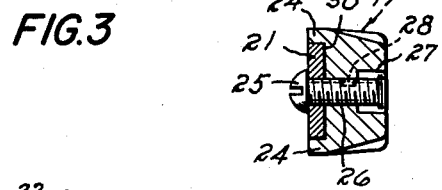
FIG. 3
FIG. 5
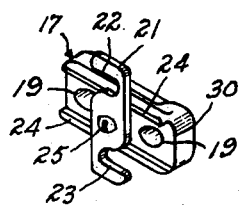
FIG. 6
FIG. 4
INVENTORS
ALDEN Y. WARNER
BY EDWARD J. SAWINA
Lindsey and Prutzman
ATTORNEYS

United States Patent Office 3,065,513
Patented Nov. 27, 1962

---

3,065,513
SEPARABLE LINK
Alden Y. Warner, Farmington, and Edward J. Sawina, Meriden, Conn., assignors to The Capewell Manufacturing Company, Hartford, Conn., a corporation of Connecticut
Filed Dec. 4, 1959, Ser. No. 857,379
1 Claim. (Cl. 24—265)

This invention relates to connecting links of the separable type intended for use with straps, shroud lines and the like. The separable link of the present invention is an improvement in links of the type disclosed and claimed in the Craven Patent No. 2,746,116 and the Warner et al. Patent No. 2,889,809, assigned to the assignee of the present invention.

Separable links of the general type referred to have particular utility with parachute harness to secure the various straps and shroud lines of the parachute and harness together and to do so in a manner which will withstand the severe shock loads encountered, particularly upon opening of the parachute. The link is made separable to permit assembly and disassembly of the harness, and yet it is essential that the link will not separate or fail during even the most abnormal shock loads.

It is accordingly an object of this invention to provide an extremely rugged separable link which can be positively locked in the closed position and which will remain closed even under severe loads which tend to distort the various link members.

It is a further object of this invention to provide an improved separable link having a minimum of parts which are quickly assembled and disassembled during normal usage thereof.

It is a still further object of this invention to provide an improved separable link which is economical to manufacture, rugged and reliable in operation, and which is convenient and easy to assemble and disassemble.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is an exploded perspective view of a preferred embodiment of the separable link of this invention;

FIG. 2 is a plan view of the assembled link interconnecting two web straps;

FIG. 3 is a partial cross section view taken along the lines 3—3 of FIG. 2;

FIG. 4 is a cross section view taken along the lines 4—4 of FIG. 2;

FIG. 5 is a partial cross section view taken along the lines 5—5 of FIG. 2; and

FIG. 6 is a perspective view of the yoke assembly in disengaging position.

Referring now to the details of construction of the separable link of the present invention, it is seen that the main portion of the link, designated in its entirety by the numeral 10, comprises a generally U-shaped body member preferably formed as a unitary metal forging consisting of an end cross member 11 and two parallel legs 12 which are of equal length and of generally cylindrical cross section. The end 13 of each leg is rounded to facilitate its insertion into a strap loop or the like and is provided with a peripheral groove 15 adjacent the rounded end. A typical use of the link is illustrated in FIG. 2 wherein the link extends through loops 2 and 4 formed by the folded and stitched strap ends 6 and 8. It will be noted that in the preferred embodiment, the cross member 11 is flattened along its inner face and provided with a peripheral flange 14 to assist in retaining the strap ends on the legs 12.

In order to bridge the legs 12 and close the open end of the link, there is provided a yoke 17 having two spaced through bores 19 dimensioned to receive the legs 12. Yoke 17, which preferably is also a forging, is positively positioned on the ends of legs 12 by means of a generally S-shaped locking plate 21 having notches 22 and 23, which notches open on opposite longitudinal edges of plate 21 and are dimensioned so that the ends of the plate can be engaged with the side walls of grooves 15. The inner edge of each notch 22, 23 is preferably semicircular and dimensioned only slightly greater than the inner diameter of the groove 15 so that the shoulders defining the edges of the groove have maximum engagement with the edges of the notches. Yoke 17 is formed with a longitudinal recess dimensioned to receive locking plate 21 between its outstanding edges or flanges 24 which provide shoulders which are effective for preventing lateral or turning movement of locking plate 21 relative to yoke 17 when the locking plate is seated in the recess. Locking plate 21 is releasably secured to yoke 17 by screw 25 which is engaged in the tapped opening 26 extending through yoke 17 midway between the bores 19. In the embodiment shown, a nylon locking plug 28 is provided in screw 25 to prevent inadvertent loosening of the screw. Preferably the tapped opening 26 is counterbored at 27 and the end of the screw 25 is peened as best shown in FIG. 5 so as to limit the extent to which screw 25 can be backed off and thus prevent it from becoming disengaged or lost.

To assemble the link, screw 25 is first backed off sufficiently to permit the locking plate 21 to be withdrawn from the recess 30 whereupon the plate 21 is free to rotate about screw 25 and can be turned generally transverse to recess 30 as illustrated in FIG. 6. Yoke 17 is then placed on the open end of U-shaped member 10 with legs 12 extending into through bores 19 and positioned so that grooves 15 in each leg 12 are generally aligned with the locking plate 21. Locking plate 21 is then rotated to bring notches 22 and 23 into engagement with the aligned groove 15 and screw 25 is tightened to seat the locking plate 21 in the recess 30 and fixedly position locking plate 21 between the flanges 24. To separate the link of this invention, it is merely necessary to reverse the procedure by loosening screw 25 so that yoke 17 can be moved away from locking plate 21 sufficiently to clear the recess 30 and permit rotation of locking plate 21 out of engagement with the grooves 15 in legs 12 thereby enabling yoke 17 to be slipped off legs 12.

From the foregoing description of a preferred embodiment of the link of this invention, it is apparent that there has been provided a separable link of only two basic units which can be easily engaged and disengaged and which, when assembled, provide an extremely rugged and reliable connecting member. Inasmuch as the locking plate 21, when the link is fully assembled, is seated within the recess 30 and extends between the ends of the legs 12, there is no possibility for disengagement except by moving the yoke 17 inwardly from the ends of the link and there is no likelihood that any material force would be applied to the yoke in this direction during normal usage of the link. A force applied to the yoke in the opposite direction, however, is adequately absorbed because the yoke and locking plate 21 are in surface-to-surface contact throughout except for the marginal portions about the notches 22, 23 which engage in the grooves 15 of the legs and thus act in shear. Accordingly, even very extreme forces applied endwise of the link will not result in release or failure of the link. The normal forces applied to the link which would be in the direction of the straps as disposed in FIG. 2 of the drawings are adequately absorbed by the rugged, one-piece construction of the yoke 17 which precludes any spreading or separation of the legs 12. As a matter of fact, even though the legs 12 should become distorted or deflected as a result of unusually severe stresses, this would only serve to produce a wedging action which would more firmly lock the yoke on the legs 12. Because of the improved arrangement of the locking parts, the assembled link has no sharp edges or projections which might cause injury or damage to the user.

As will be apparent to persons skilled in the art, various modifications and adaptations of the structure above described will become readily apparent without departure from the spirit and scope of the invention, the scope of which is defined in the appended claims.

We claim:

A separable link comprising a generally U-shaped member having a pair of leg portions, each provided with a circumferential groove adjacent the end thereof, a yoke member having a pair of spaced apertures through which said leg portions extend and readily disengageable therefrom, said yoke member having a longitudinal recess in its outer face extending transversely of said leg portions, a locking plate adapted to seat in said recess and having notches in its opposite side edges for encompassing the leg portions with the edge portions of the notches engaged in the circumferential grooves, and a screw securing the locking plate in the recess, said screw being disposed intermediate the apertures of the yoke member and being adjustable axially to permit the locking plate to be moved laterally outwardly from the recess of said yoke member, said locking plate being pivotable about the screw into and out of locking engagement with the leg portions when disposed outwardly of said recess, said yoke member being removable from the legs of said U-shaped member upon disengagement of the locking plate from the grooves of said legs of the link.

References Cited in the file of this patent

UNITED STATES PATENTS

| | | |
|---|---|---|
| 530,166 | Dost | Dec. 4, 1894 |
| 2,178,170 | Hager | Oct. 31, 1939 |
| 2,607,956 | Brutus | Aug. 26, 1952 |
| 2,634,475 | Browne | Apr. 14, 1953 |
| 2,677,149 | Fineran | May 4, 1954 |
| 2,746,116 | Craven | May 22, 1956 |

FOREIGN PATENTS

| | | |
|---|---|---|
| 448,946 | Great Britain | June 18, 1936 |
| 816,893 | France | May 10, 1937 |
| 918,240 | Germany | Sept. 23, 1954 |